US012553596B1

(12) United States Patent
Tseng

(10) Patent No.: US 12,553,596 B1
(45) Date of Patent: Feb. 17, 2026

(54) LIGHT EMITTING DEVICE AND WEARABLE OBJECT WITH LIGHTING FUNCTION

(71) Applicant: Shen-Ko Tseng, Taipei (TW)

(72) Inventor: Shen-Ko Tseng, Taipei (TW)

( * ) Notice: Subject to any disclaimer, the term of this patent is extended or adjusted under 35 U.S.C. 154(b) by 0 days.

(21) Appl. No.: 18/957,947

(22) Filed: Nov. 25, 2024

(51) Int. Cl.

| | |
|---|---|
| ***F21V 23/04*** | (2006.01) |
| ***F21L 4/04*** | (2006.01) |
| ***F21V 5/00*** | (2018.01) |
| ***F21V 15/01*** | (2006.01) |
| ***F21V 33/00*** | (2006.01) |
| ***F21Y 115/10*** | (2016.01) |
| ***H05B 45/10*** | (2020.01) |
| ***H05B 45/20*** | (2020.01) |
| ***H05B 47/17*** | (2020.01) |

(52) U.S. Cl.
CPC ............ *F21V 23/0492* (2013.01); *F21L 4/04* (2013.01); *F21V 5/008* (2013.01); *F21V 15/01* (2013.01); *F21V 23/0407* (2013.01); *F21V 23/0421* (2013.01); *F21V 33/0008* (2013.01); *H05B 45/10* (2020.01); *H05B 45/20* (2020.01); *H05B 47/17* (2020.01); *F21Y 2115/10* (2016.08)

(58) Field of Classification Search
CPC ............. F21V 23/0407; F21V 23/0421; F21V 23/0492; F21V 15/01; F21V 33/0008; F21V 5/008; F21L 4/04; H05B 45/10; H05B 45/20; H05B 47/17
See application file for complete search history.

(56) References Cited

U.S. PATENT DOCUMENTS

| | | | | |
|---|---|---|---|---|
| 5,465,197 A * | 11/1995 | Chien | .................. | A43B 1/0036 36/137 |
| 5,709,464 A * | 1/1998 | Tseng | .................. | A42B 1/244 36/137 |
| 5,746,500 A * | 5/1998 | Chien | .................. | A43B 1/0036 36/137 |
| 7,976,178 B2 * | 7/2011 | Esses | .................. | A41B 11/001 362/276 |
| 2021/0298406 A1 * | 9/2021 | Twombly | ............. | A43B 1/0054 |
| 2022/0264989 A1 * | 8/2022 | Willis | .................. | H04R 1/028 |

* cited by examiner

*Primary Examiner* — Thomas M Sember
(74) *Attorney, Agent, or Firm* — WPAT, PC

(57) ABSTRACT

A light emitting device includes projection module and a controlling module. The projection module includes a lighting component, a transparent plate and a lens. The lighting component is configured to emit light. The transparent plate has a pattern. The light emitted from the lighting component is patterned by the transparent plate. The lens module is configured to form a projection image outside the light emitting device based on the patterned light. The controlling module is electrically coupled to the projection module and selectively activates the lighting component to emit the light.

20 Claims, 8 Drawing Sheets

LIGHT EMITTING DEVICE AND WEARABLE OBJECT WITH LIGHTING FUNCTION

BACKGROUND OF THE INVENTION

1. Field of the Invention

The present invention relates to a light emitting device, especially to a light emitting device with projecting function and a wearable object with light emitting device.

2. Description of the Prior Art

With the popularity of miniaturized light sources in recent years, light emitting components have been commonly installed on non-electronic products, such as shoes, clothes, hats, backpacks, or any object that can be carried or worn. For example, a Light Emitting Device (LED) can be the miniaturized light source installed on the products. The form of the miniaturized light source configured on a portable object has not only a safety warning function, but also a beautifying effect of the unique visual appearance. For example, if the shoes or clothes of the pedestrians or children can emit light or glare with different colors, it can remind the driver of the existence of the pedestrians or children at night or in the dark to avoid accidents.

At present, the miniaturized light sources or LEDs are used by configuring the light emitting devices including LEDs or similar miniaturized light emitting components directly on wearable objects and personal belongings. The controlling circuit of the light emitting device is partially hided inside the wearable object, and the light emitting components controlled by the controlling circuit can be directly configured on the surface of the wearable object, under the light-transmitting surface of the wearable object, or inside the wearable object connected to the light-guiding component.

The light emitted by the above-mentioned light emitting components can be used for warning or beautification. If the light emitted by the wearable object can have different visual effects, the beautification function will be more significant. In general, wearable objects usually use LEDs/small light sources with different colors or special patterns and the built-in flash mode program of the control circuit to control the light source to emit light to achieve colorful visual effects.

The above methods are all based on building all the changeable styles inside the wearable object. When the user is tired of the visual effects produced by the wearable object and wants to change to new visual effects, the user must purchase the same new wearable objects, but only different visual effects. However, if the original object is not damaged, purchasing duplicate wearable objects will become a burden to the user and reduce their purchasing desire.

SUMMARY OF THE INVENTION

Therefore, the present invention provides a light emitting device and a wearable object with lighting function to solve the problems of the prior art.

According to an embodiment of the present invention, the light emitting device includes a projection module and a controlling module. The projection module comprises a lighting component, a transparent plate, a lens module and a case. The lighting component is configured to emit light. The transparent plate has a pattern. The light emitted from the lighting component is patterned by the transparent plate. The lens module is configured to form a projected image outside the light emitting device based on the patterned light. The case has an axis. The lighting component, the transparent plate and the lens module are arranged along the axis of the case and accommodated by the case. The controlling module is electrically coupled to the projection module and comprises a circuit board, a controlling integrated circuit and a battery. The circuit board has a first surface and a second surface opposite to the first surface. The controlling integrated circuit is disposed on the circuit board. The battery is disposed on the circuit board and configured to provide electrical power to the controlling integrated circuit and the lighting component. Wherein, the controlling module selectively activates the lighting component to emit light.

Wherein, the controlling module further includes a motion sensor encapsulated in a waterproof case and electrically connected to the controlling integrated circuit. The motion sensor sequentially generates a set of vibrating signals according to a set of external forces sequentially applied to the controlling module respectively. Wherein, the controlling module activates the lighting component to emit the light when the controlling module receives any of the set of vibrating signals.

Wherein, the controlling integrated circuit controls a brightness of the light emitted by the lighting component according to the set of vibrating signals.

Wherein, the controlling integrated circuit controls a lighting mode of the light emitted by the lighting component according to the set of vibrating signals. Wherein, the lighting mode comprises a continuous mode for a specific period, a flashing mode with at a specific interval, a sequential flashing mode, a synchronous flashing mode, a reciprocating flashing mode, an alternating flashing mode, a marquee flashing mode, a gradual brightening and dimming mode, a gradual dimming and brightening mode, or a combination thereof.

Wherein, the lighting component includes a set of different color LED chips, and the controlling integrated circuit controls a lighting color of the light emitted by the lighting component according to the set of vibrating signals.

Wherein, the light emitting device further includes a switch module electrically connected to the controlling integrated circuit. The switch module sequentially generates a set of controlling signals according to a set of external pressures sequentially applied to the switch module respectively.

Wherein, when the external pressure applied to switch module is greater than 1 second, the set of controlling signals includes a turn-on signal for the controlling module to activate the lighting component to emit the light, or a turn-off signal to cut off the electrical power to the controlling integrated circuit and the lighting component.

Wherein, when the external pressure applied to switch module is not greater than 1 second, the set of controlling signals includes a first controlling signal for the controlling integrated circuit to control a brightness of the light emitted by the lighting component, or a second controlling signal for the controlling integrated circuit to control a lighting color of the light emitted by the lighting component, or a third controlling signal for the controlling integrated circuit to control a lighting mode of the light emitted by the lighting component.

Wherein, the case of the projection module is disposed on the second surface of the circuit board, and the battery of the controlling module is disposed on the first surface of the circuit board; wherein the diameter of the case is the same or substantially the same as that of the circuit board, or the diameter of the circuit board is the same or substantially the same as that of the battery.

Wherein, the case includes an assembling structure. The transparent plate is movably disposed in the assembling structure.

Wherein, the size of the projected image external to the light emitting device is adjustable or controllable.

According to another one embodiment of the present invention, the wearable object with lighting function includes a main body and a light emitting device, and the light emitting device is disposed on the main body. The light emitting device includes a projection module and a controlling module. The projection module comprises a lighting component, a transparent plate, a lens module and a case with an axis. The lighting component is configured to emit light. The transparent plate has a pattern. The light emitted from the lighting component is patterned by the transparent plate. The lens module is configured to form a projected image outside the main body based on the patterned light. The lighting component, the transparent plate and the lens module are arranged along the axis of the case and accommodated by the case. The controlling module is electrically coupled to the projection module and comprises a circuit board, a controlling integrated circuit and a battery. The circuit board has a first surface and a second surface opposite to the first surface. The controlling integrated circuit is disposed on the circuit board. The battery is disposed on the circuit board and configured to provide electrical power to the controlling integrated circuit and the lighting component. Wherein, the controlling module selectively activates the lighting component to emit light.

Wherein, the controlling module further comprises a motion sensor encapsulated in a waterproof case and electrically connected to the controlling integrated circuit, the motion sensor sequentially generates a set of vibrating signals according to a set of external forces sequentially applied to the controlling module respectively; wherein the controlling module activates the lighting component to emit the light when the controlling module receives any of the set of vibrating signals.

Wherein, the controlling integrated circuit controls a brightness of the light emitted by the lighting component according to the set of vibrating signals.

Wherein, the controlling integrated circuit controls a lighting mode of the light emitted by the lighting component according to the set of vibrating signals. The lighting mode comprises a continuous mode for a specific period, a flashing mode with at a specific interval, a sequential flashing mode, a synchronous flashing mode, a reciprocating flashing mode, an alternating flashing mode, a marquee flashing mode, a gradual brightening and dimming mode, a gradual dimming and brightening mode, or a combination thereof.

Wherein, the lighting component includes a set of different colors LED chips. The controlling integrated circuit controls a lighting color of the light emitted by the lighting component according to the set of vibrating signals.

Wherein, the light emitting device further includes a switch module electrically connected to the controlling integrated circuit. The switch module sequentially generates a set of controlling signals according to a set of external pressures sequentially applied to the switch module respectively.

Wherein, the case of the projection module is disposed on the second surface of the circuit board, and the battery of the controlling module is disposed on the first surface of the circuit board; wherein the diameter of the case is the same or substantially the same as that of the circuit board, or the diameter of the circuit board is the same or substantially the same as that of the battery.

Wherein, the case includes an assembling structure. The transparent plate is movably disposed in the assembling structure.

Wherein, the size of the projected image external to the main body is adjustable or controllable.

In summary, the light emitting device of present invention can project light with specific pattern to provide newly and interesting visual effect. Furthermore, the light emitting device of present invention can change transparent plates with different patterns of the light emitting device, thereby increasing different visual effects to enhance interest. Moreover, the light emitting device of present invention can be installed on a variety of different wearable objects, and the visual effect of changing the light emitted by the light emitting device is achieved by replacing the transparent plates with different patterns. Therefore, it will be more convenient to beautify wearable objects. At the same time, the cost is reduced by only replacing the transparent plate, allowing the user to replace the visual effects of wearable objects with fewer burdens, thereby promoting the purchasing desire.

BRIEF DESCRIPTION OF THE APPENDED DRAWINGS

DETAILED DESCRIPTION OF THE INVENTION

Figure 1:
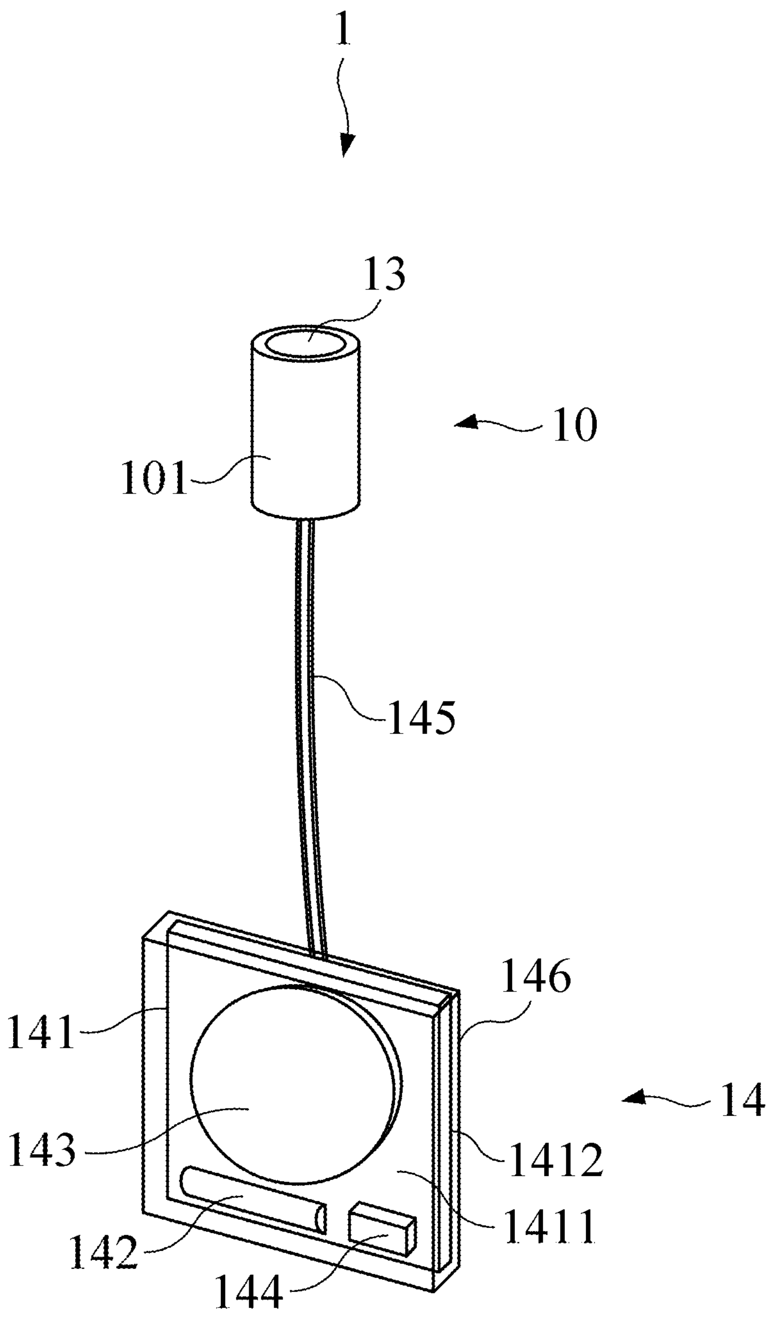
FIG. 1 is a schematic diagram illustrating a light emitting device in an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Figure 2:
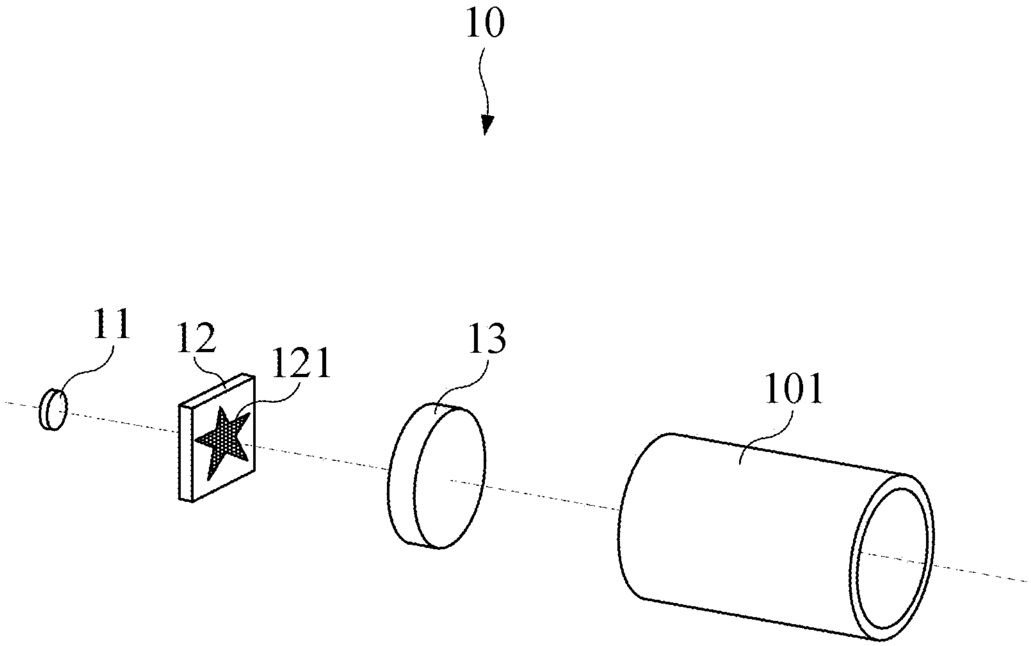
FIG. 2 is an exploded diagram illustrating a projection module of the light emitting device in an embodiment of the present invention.
Figure 3A:
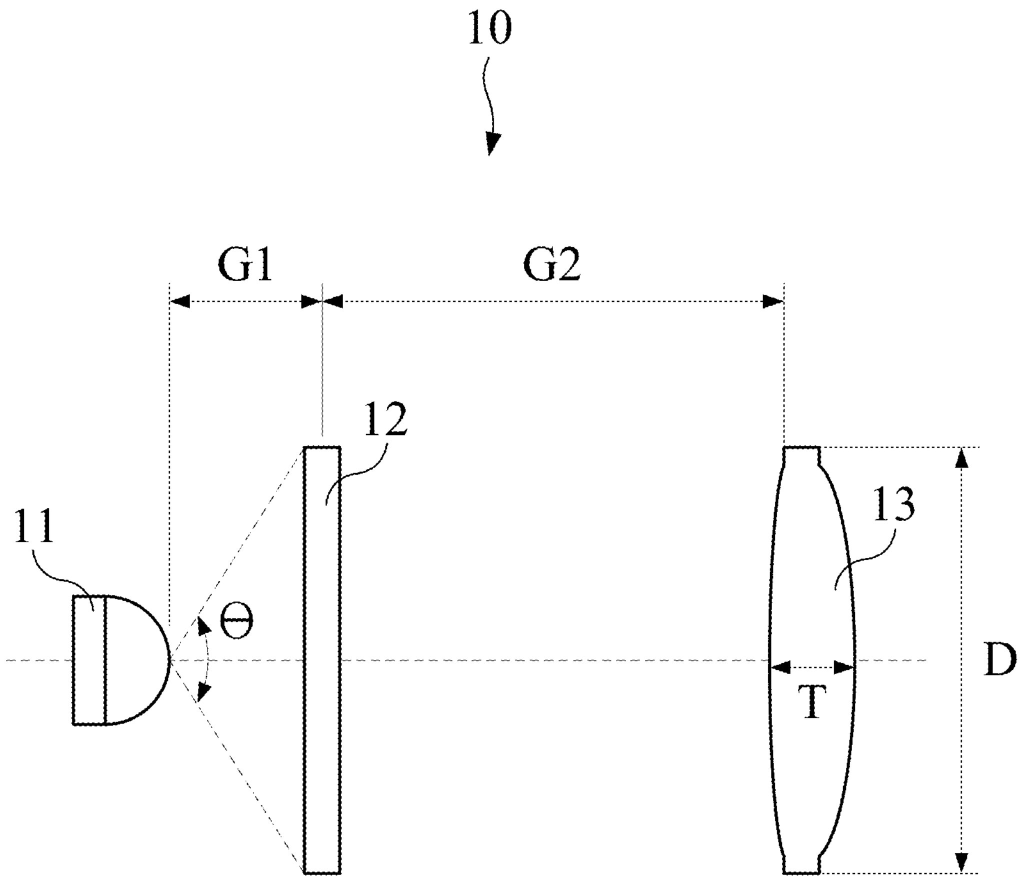
FIG. 3A is a schematic diagram illustrating another perspective of the projection module in FIG. 2.

Please refer to FIG. 1, FIG. 2 and FIG. 3A. FIG. 1 is a schematic diagram illustrating a light emitting device 1 in an embodiment of the present invention. FIG. 2 is an exploded diagram illustrating a projection module of the light emitting device in an embodiment of the present invention. FIG. 3A is a schematic diagram illustrating another perspective of the projection module in FIG. 2. As shown in FIG. 1, FIG. 2 and FIG. 3A, the light emitting device 1 includes a projection module 10 and a controlling module 14. The projection module 10 includes a case 101, a lighting component 11, a transparent plate 12 and a lens module 13. The case 101 is configured to accommodate the lighting component 11, the transparent plate 12 and the lens module 13. The lighting component 11 is configured to emit light. The transparent plate 12 has a pattern 121 and covers the lighting component 11 to receive and transfer the light. The lens module 13 covers the transparent plate 12 and configured to receive the light from the transparent plate 12 and project the light. The controlling module 14 can control and drive the lighting component 11 to emit light. In practice, the light emitted by the lighting component 11 can pass through the transparent plate 12 to form the light with the pattern 121, and then the lens module 13 projects the light with the pattern 121, so that the user can observe the light with visual effects.

In this embodiment, the lighting component 11, the transparent plate 12 and the lens module 13 are arranged in a stacked manner along an axis. The case 101 includes a first end and a second end corresponding to the first end, and the second end has an opening. The lighting component 11 can be disposed close to the first end. The lens module 13 can be disposed close to the second end and exposed to the case 101 through the opening. As shown in FIG. 3A, a first gap G1 is formed between the lighting component 11 and the transparent plate 12, and a second gap G2 is formed between the transparent plate 12 and the lens module 13. The length of the first gap G1 and the size of the transparent plate 12 can be determined according to the luminous angle θ of the lighting component 11. The pattern 121 is not limited to the star pattern in FIG. 2. In practice, the pattern 121 can be determined as design or requirement. The lens module 13 can be convex lens, biconvex lens, plano-convex lens, meniscus lens. The size of the lens module 13 can be determined by the size of the transparent plate 12. The second gap G2 can be regarded as the focal length and can be determined by the size of the lens module 13.

As shown in FIG. 3A, in one embodiment, the length of the first gap G1 is around 2 mm, and the length of the second gap G2 is around 10.5 mm. Furthermore, the lens module 13 includes one lens. The diameter D of the lens is around 8.5 mm, and the thickness T of the lens is around 2.37 mm.

Figure 3B:
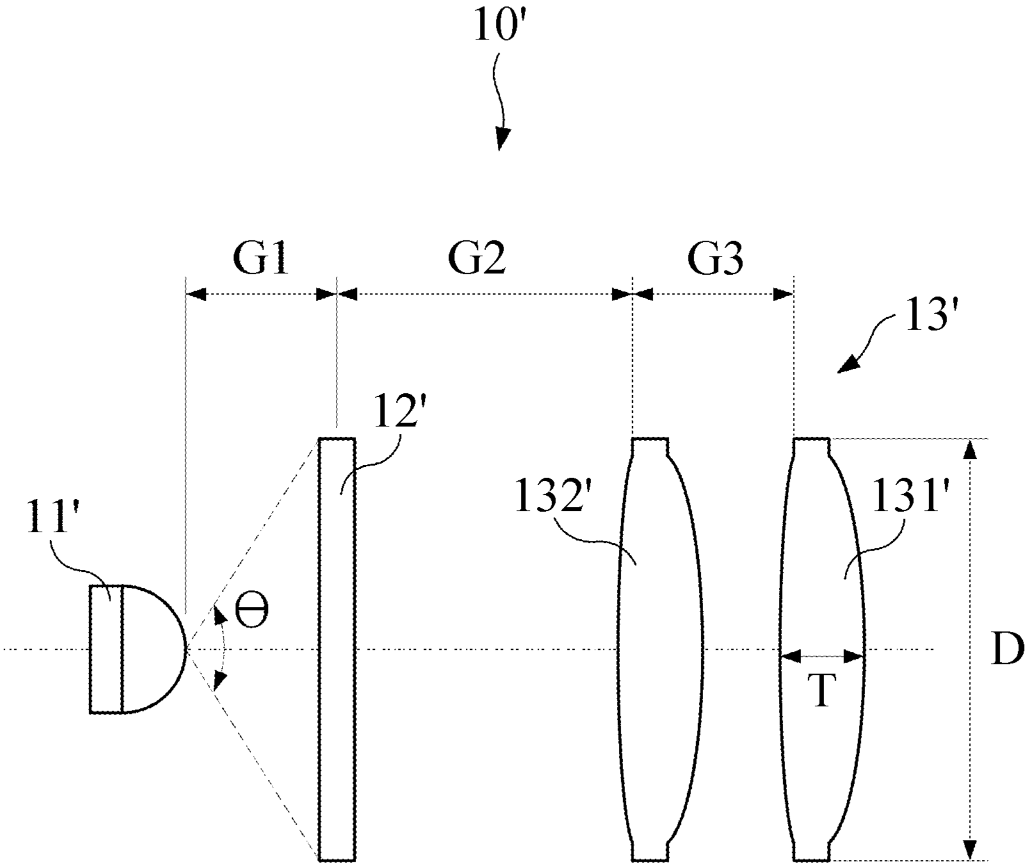
FIG. 3B is a schematic diagram illustrating the projection module in an embodiment of the present invention.

In practical application, the lens module also can include one more lens. Please refer to FIG. 3B. FIG. 3B is a schematic diagram illustrating the projection module 10' in an embodiment of the present invention. As shown in FIG. 3B, the lens module 13' of the projection module 10' includes two lenses, and a third gap G3 is formed between the first lens 131' and the second lens 132'. Similarly, the lighting component 11, the transparent plate 12, the first lens 131' and the second lens 132' are arranged in a stacked manner along the axis, and the third gap G3 can be regarded as the focal length. In this embodiment, the length of the first gap G1 is around 2 mm, the length of the second gap G2 is around 4.1 mm, and the length of the third gap G3 is around 2.2 mm. The diameter of the first lens 131' is around 8.5 mm, and the thickness of the first lens 131' is around 2.37 mm. The size of the second lens 132' is same as the first lens 131'.

As shown in FIG. 1, in this embodiment, the controlling module 14 includes a circuit board 141, a controlling integrated circuit 144, a battery 143 and a motion sensor 142. The circuit board 141 includes a first surface 1411 and a second surface 1412 opposite to the first surface 1411. The controlling integrated circuit 144 is disposed on the first surface 1411 of the circuit board 141 and electrically connected to the lighting component 11. The controlling integrated circuit 144 is configured to control and drive the lighting component 11 to emit light. The battery 143 is disposed on the first surface 1411 of the circuit board 141 and configured to provide power for the controlling integrated circuit 144 and the lighting component 11. The motion sensor 142 is disposed on the first surface 1411 of the circuit board 141 and electrically connected to the controlling integrated circuit 144.

In this embodiment, the motion sensor 142 is configured to generate a vibrating signal according to the motion of the controlling module 14 caused by an external force, and the controlling integrated circuit 144 drives the lighting component 11 to emit light according to the vibrating signal. The motion sensor 142 can be a vibration sensor. When the motion sensor 142 detects the external force applied on the circuit board 141 or the controlling module 14, the motion sensor 142 generates and sends the vibrating signal to the controlling integrated circuit 144, and then the controlling integrated circuit 144 can control and drive the lighting component 11 to emit light.

Furthermore, the controlling integrated circuit 144 can control the brightness or flash pattern of the light emitted by the lighting component 11 according to the vibrating signal. In practice, the light emitted by the lighting component 11 can include a plurality of degrees of brightness (such as the light with the first degree of brightness is brightest, and the light with the third degree of brightness is darkest). When the motion sensor 142 generates a first vibrating signal by detecting a first external force at the first time, the controlling integrated circuit 144 controls the lighting component 11 to emit light with the first degree of brightness. Afterward, the motion sensor 142 generates a second vibrating signal when a second external force is applied to the motion sensor 142, the controlling integrated circuit 144 controls the lighting component 11 to emit light with the second degree of brightness. Thereafter, the motion sensor 142 generates a third vibrating signal when a third external force is applied to the motion sensor 142, the controlling integrated circuit 144 controls the lighting component 11 to emit light with the third degree of brightness. Thus, the motion sensor 142 sequentially generates a set of vibrating signals according to a set of external forces sequentially applied to the controlling module respectively. For example, the motion sensor 142 will generate the first vibrating signal again when a fourth external force is applied to the motion sensor 142, the controlling integrated circuit 144 controls the lighting component 11 to emit light with the first degree of brightness. The motion sensor 142 can repeat the set of vibrating signals N times, where N is an integer greater than 0.

Moreover, the controlling integrated circuit 144 can control the lighting component 11 to emit light with a lighting mode according to the vibrating signal. In practice, the controlling integrated circuit 144 can pre-store a plurality of lighting modes. When the motion sensor 142 generates the first vibrating signal by detecting the external force at the first time, the controlling integrated circuit 144 controls the lighting component 11 to emit light with the first lighting mode. When the motion sensor 142 generates the second vibrating signal by detecting the external force again, the controlling integrated circuit 144 controls the lighting component 11 to emit light with the second lighting mode. When the motion sensor 142 generates the third vibrating signal by detecting the third external force, the controlling integrated circuit 144 controls the lighting component 11 to emit light with the third lighting mode. Furthermore, the motion sensor 142 also can generate the vibrating signals repeatedly. For example, the motion sensor 142 will generate the first vibrating signal again by detecting the fourth external force, the controlling integrated circuit 144 controls the lighting component 11 to emit light with the first lighting mode. The motion sensor 142 can repeat the cycle of vibrating signals N times, where N is an integer greater than 0. The lighting modes may include continuous lighting, flashing once, continuous flashing, flashing at a specific interval time sequence, a sequential flashing mode, a synchronous flashing mode, a reciprocating flashing mode, an alternating flashing mode, a marquee flashing mode, a gradual brightening and dimming mode, and a gradual dimming and brightening mode, but it is not limited thereto.

For example, the lighting component 11 includes six LEDs. When the controlling integrated circuit 144 controls the lighting component 11 to emit light with the sequential flashing mode, the controlling integrated circuit 144 drives the first LED to the sixth LED to emit light in sequence for N times. It is possible that in the sequential flashing mode, in the first and/or second sequence the flash frequency of the LEDs is fix, but for rest sequencies the flash sequency of the LEDs is different from or gradually changed (could be called as “frequency variation mode”). When the controlling integrated circuit 144 controls the lighting component 11 to emit light with the synchronous flashing mode, the controlling integrated circuit 144 drives the first LED to the sixth LED to emit flash light at the same time with same flashing frequency. When the controlling integrated circuit 144 controls the lighting component 11 to emit light with the reciprocating flashing mode, the controlling integrated circuit 144 drives the first LED to the sixth LED to emit light in sequence, and then emit light in reverse order from the sixth LED to the first LED to form a lighting cycle. When the controlling integrated circuit 144 controls the lighting component 11 to emit light with the alternating flashing mode, the controlling integrated circuit 144 drives the LEDs to sequentially emit light in the order of the first LED, the third LED, the second LED, the fifth LED, the fourth LED and the sixth LED, to form a lighting cycle. When the controlling integrated circuit 144 controls the lighting component 11 to emit light with the gradual dimming mode, the controlling integrated circuit 144 drives the first LED to emit the maximum brightness and then gradually dim, and then the second LED to sixth LED will follow the same lighting pattern sequentially. When the controlling integrated circuit 144 controls the lighting component 11 to emit light with the gradual brightening mode, the controlling integrated circuit 144 drives the first LED to emit light that gradually brightens to a certain brightness and maintain the brightness until turning off, and the second LED to sixth LED can follow the same lighting mode sequentially.

In one embodiment, the lighting component 11 includes a plurality of LEDs, and the LEDs are configured to emit lights with different color modes respectively. The controlling integrated circuit 144 controls and drives the LEDs to emit lights with a lighting color mode according to the vibrating signal. Similarly, the controlling integrated circuit 144 controls the LEDs to emit lights with the first lighting color mode when the motion sensor 142 generates the first vibrating signal, the controlling integrated circuit 144 controls the LEDs to emit lights with the second lighting color mode when the motion sensor 142 generates the second vibrating signal, and the controlling integrated circuit 144 controls the LEDs to emit lights with the third lighting color mode when the motion sensor 142 generates the third vibrating signal. Furthermore, the motion sensor 142 also can generate the vibrating signals repeatedly. For example, when the motion sensor 142 generates the fourth vibrating signal, the controlling integrated circuit 144 controls the LEDs to emit lights with the first lighting color mode. The motion sensor 142 can repeat the cycle of vibrating signals N times, where N is an integer greater than 0. In practice, the lighting color modes may include red-tinted, green-tinted, yellow-tinted, orange-tinted, cyan green-tinted, lime green-tinted, purple-tinted, pink-tinted, ice blue-tinted, white-tinted or a combination thereof.

As shown in FIG. 1, in this embodiment, the circuit board 141 (especially the controlling integrated circuit 144 on the circuit board 141) can be electrically connected the lighting component 11 by wires 145. Therefore, the controlling module 14 can communicate with the lighting component 11. In addition, the light emitting device 1 further includes a waterproof case 146 for covering the controlling module 14. The waterproof case 146 can cover the circuit board 141, the controlling integrated circuit 144, the battery 143, the motion sensor 142 and other controlling components disposed on the circuit board 141. In practice, the material of the waterproof case 146 can be polyethylene (PE), polypropylene (PP), Polyvinyl chloride (PVC), or other insulating soft materials.

Figure 4:
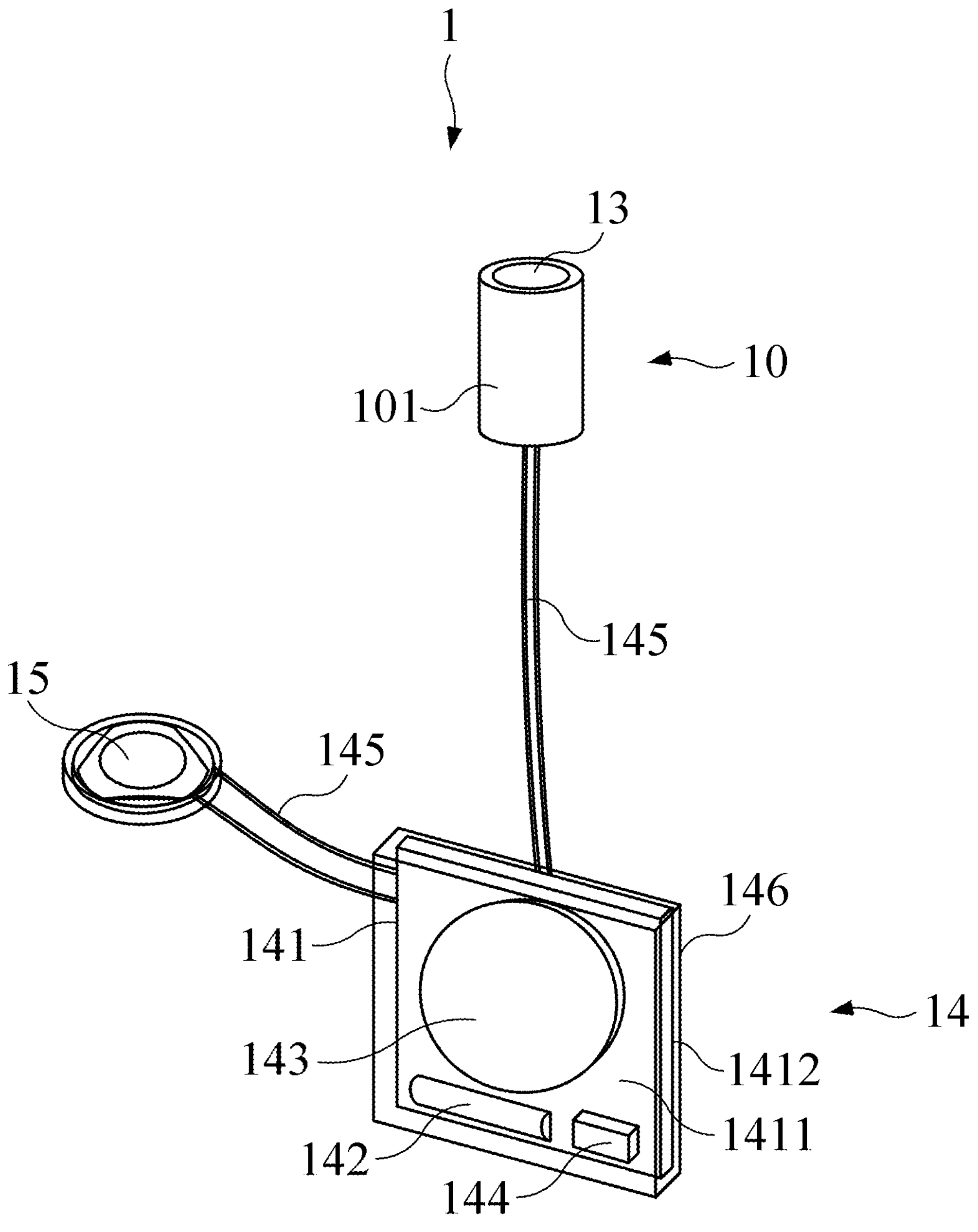
FIG. 4 is a schematic diagram illustrating the light emitting device in an embodiment of the present invention.

Please refer to FIG. 4. FIG. 4 is a schematic diagram illustrating the light emitting device 1 in an embodiment of the present invention. As shown in FIG. 4, the difference of this embodiment and the aforementioned embodiment is that light emitting device 1 of this embodiment further includes a switch module 15. The switch module 15 is electrically connected to the circuit board 141 and configured to generate a controlling signal. The switch module 15 can be slide switch, tactile switch, rocker switch, push button switch and toggle switch, and can generate a controlling signal when the switch module is pressed by an external pressure. The switch module 15 generates a first controlling signal when a first external pressure is applied to the switch module 15 at the first time. Afterward, switch module 15 generates a second controlling signal when a second external pressure is applied to the switch module 15 at the second time. Thereafter, the switch module 15 generates a third controlling signal when a third external pressure is applied to the switch module 15 at the third time. That is, the switch module 15 could sequentially generates a set of controlling signals according to a set of external pressures sequentially applied to the switch module 15 respectively. Furthermore, the switch module 15 also can generate the controlling signals repeatedly. For example, the switch module 15 will generate the first controlling signal again when a fourth external pressure is applied to the switch module 15 at the fourth time. The switch module 15 can repeat the cycle of controlling signals N times, where N is an integer greater than 0.

Moreover, the controlling signal can include a turn-on signal and a turn-off signal. The controlling integrated circuit 144 can supply power to the lighting component 11 to emit light according to the turn-on signal, and can cut off power to lighting component 11 according to the turn-off signal. Furthermore, the switch module 15 also can be pressed with a time length (such as greater than 1 second) to generate the turn-on signal at first time; and, the switch module 15 generates the turn-off signal when be pressed with the time length again. In practice, the controlling integrated circuit 144 can control the lighting component 11 to emit light continuously after receiving the turn-on signal, and then turn off the light-emitting component 11 until receiving the turn-off signal. Furthermore, the controlling integrated circuit 144 can control the lighting component 11 to emit light after receiving the turn-on signal, and control the lighting component 11 to emit light with the different degrees of brightness, the different lighting modes and the different lighting color modes according to aforementioned the set of vibrating signals generated by the motion sensor 142 and the set of controlling signals generated by the switch module 15, and then turn off the light-emitting component 11 when receiving the turn-off signal.

Moreover, the switch module 15 also can generate a controlling signal set (by pressed with a time length equal to or less 1 second to generate one controlling signal), and the controlling signal set may include a plurality of controlling signals. Each of controlling signals can be corresponding to one of the aforementioned degrees of brightness, colors and lighting modes. For example, the controlling signal set includes a first controlling signal, a second controlling signal and a third controlling signal corresponding to red light, green light and blue light respectively. When the user presses the switch module 15 with first time, second time and third time in sequence, the controlling integrated circuit 144 can control the lighting component 11 to emit red light, green light and blue light sequentially. Therefore, after drives the lighting component 11 to emit light according to the turn-on signal, the controlling integrated circuit 144 can control the lighting component 11 to emit various lights according to the controlling signal set, and then the lens module 13 can project various lights with the pattern 121.

Furthermore, the switch module 15 also can generate the controlling signal set repeatedly. For example, the controlling signal set includes a first controlling signal, a second controlling signal and a third controlling signal corresponding to a first lighting mode, a second lighting mode and a third lighting mode respectively. When the user presses the switch module 15 with the fourth time, the controlling integrated circuit 144 can control the lighting component 11 to emit light with the first lighting mode again.

In addition, the controlling integrated circuit 144 can control the lighting component 11 according to the controlling signal and the vibrating signal. In practice, the controlling integrated circuit 144 drives the lighting component 11 to emit light according to the controlling signal, and then controls the brightness/colors/lighting modes of the lighting component 11 according to the vibrating signal. Similarly, in this embodiment, the circuit board 141 (especially the controlling integrated circuit 144 on the circuit board 141) can be electrically connected the switch module 15 by wires 145.

As shown in FIG. 3A, FIG. 3B and FIG. 4, in one embodiment, the focal length (that is the second gap G2) of the lens module 13 can be adjustable manually by an adjustment element (not shown) on the lens module 13, or controllable by the controlling module 14 (programs stored in the controlling module 14) or the switch module 15 (by pressing the switch module 15 more than 1s), and then the size of the projected image external to the light emitting device 1 could be adjusted accordingly. For example, the controlling integrated circuit 144 can control and drive the lens module 13 to move along the axis according to the programs or the controlling signal from the switch module 15 to adjust the length of the second gap G2 (or the G2 and G3 in FIG. 3B), so that the lens module 13 can project various size for the pattern 121.

Figure 5:
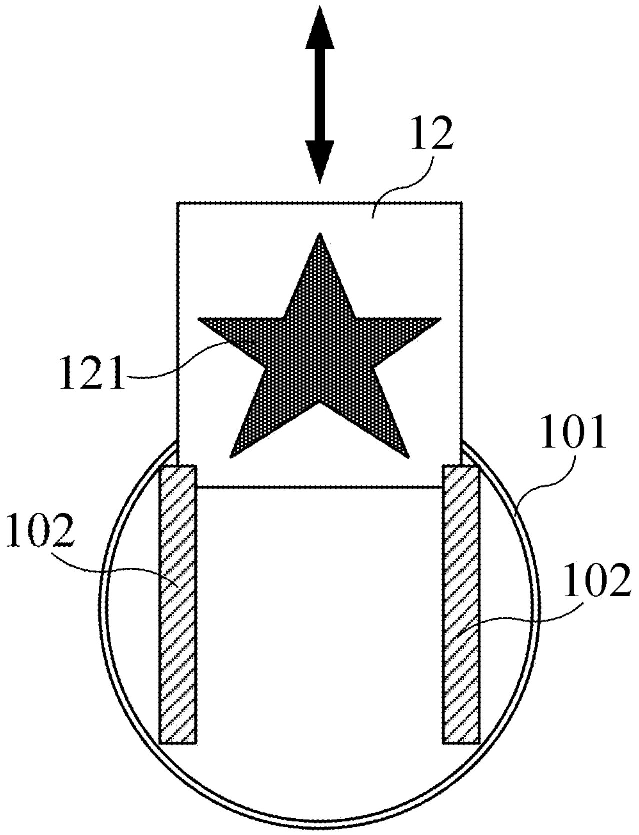
FIG. 5 is a schematic diagram illustrating the transparent plate and the case of the light emitting device in an embodiment of the present invention.

Please refer to FIG. 5. FIG. 5 is a schematic diagram illustrating the transparent plate 12 and the case 101 of the projection module 10 in an embodiment of the present invention. As shown in FIG. 5, in this embodiment, the case 101 further includes an assembling structure 102, the transparent plate 12 is fixed or movably disposed in the assembling structure 102 to be configured in the case 101. In practice, the case 101 includes an assembling opening disposed on the surface of the case 101 and communicated with the assembling structure 102. The assembling structure 102 can be a slide structure. The transparent plate 12 can pass through the assembling opening and move along the slide structure to install into/detach from the case 101 (as shown the arrow in figure). Therefore, the user can change transparent plates with different patterns of the light emitting device, thereby increasing different visual effects to enhance interest.

Figure 6:
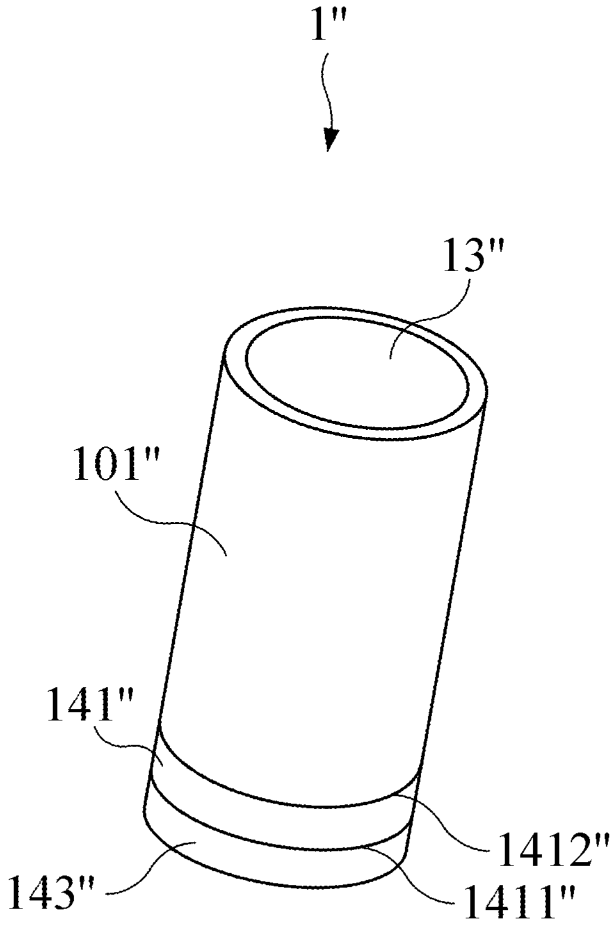
FIG. 6 is a schematic diagram illustrating the light emitting device in another one embodiment of the present invention.

In addition to the aforementioned embodiments, the light emitting device can also be in other types. Please refer to FIG. 6. FIG. 6 is a schematic diagram illustrating the light emitting device 1" in another one embodiment of the present invention. As shown in FIG. 6, the difference of this embodiment and the aforementioned embodiment is that the battery 143" is disposed on the first surface 1411" of the circuit board 141" and the case 101" is disposed on the second surface 1412" of the circuit board 141". In practice, the lighting component can be electrically connected to the circuit board 141" directly, and the case 101" can fixed on the second surface 1412" of the circuit board 141". Moreover, the diameter of the case 101" is the same or substantially the same as that of the circuit board 141", and is also the same or substantially the same as that of the battery 143". Furthermore, the controlling integrated circuit, the battery and the motion sensor (not shown in figure) are also disposed on the circuit board 141". Therefore, when the external force is applied on the circuit board 141", the battery 143" or the case 101", the motion sensor will generate the vibrating signal, and then the controlling integrated circuit can control and drive the lighting component to emit light, and the lens module 13" can project the light with the pattern.

Figure 7:
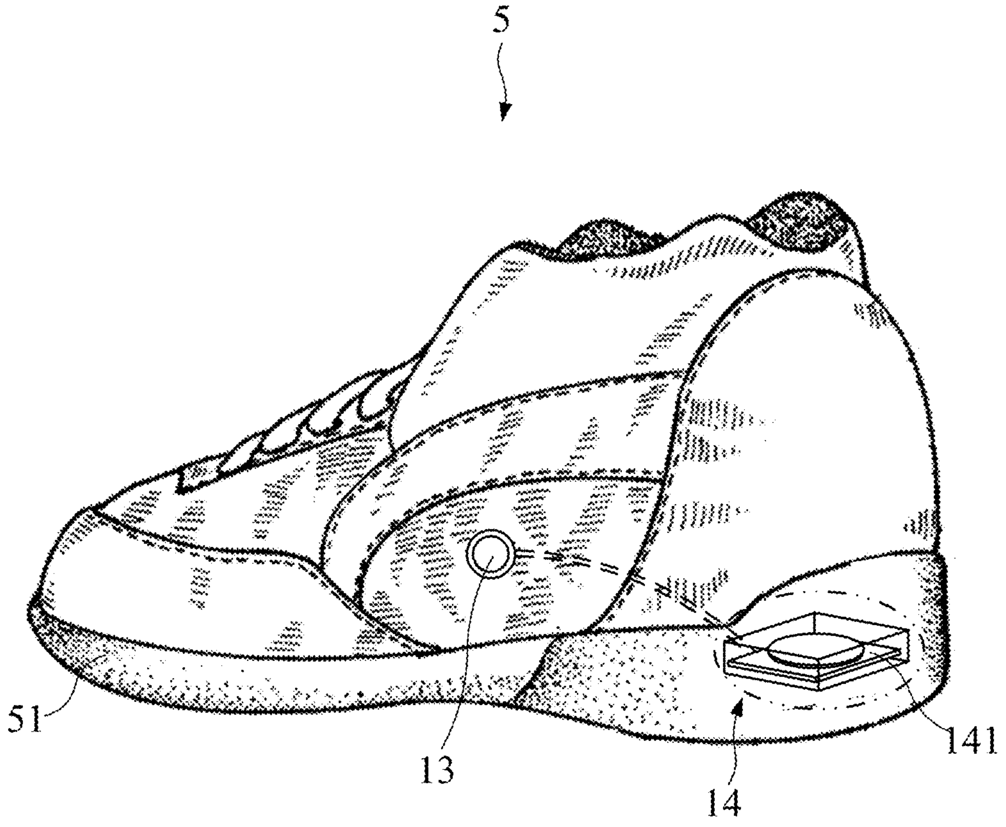
FIG. 7 is a schematic diagram illustrating a wearable object with light emitting device in an embodiment of the present invention.

Please refer to FIG. 1, FIG. 2 and FIG. 7. FIG. 7 is a schematic diagram illustrating a wearable object 5 with light emitting device 1 in an embodiment of the present invention. As shown in FIG. 7, in this embodiment, the wearable object 5 is a footwear or shoe, which can be worn by the user for walking, running, jumping and other sports. The wearable object 5 includes a main body 51, and the light emitting device 1 can be disposed in the main body 51. The main body 51 can be the sole of the footwear. The light emitting device 1 includes the case 101, the lighting component 11, the transparent plate 12, the lens module 13 and the controlling module 14. The case 101 is coupled to the main body 51, the lighting component 11, the transparent plate 12 and the lens module 13 are contained in the case 101, and the lens module 13 is exposed to the main body 51. In practice, the case 101 can be disposed in the main body 51, and only the lens module 13 is exposed to the surface of the main body 51. In one embodiment, the case 101 can be fixed or attached to the surface of the main body, for example to the front toe portion, to the side surface, the back surface, or to the strap of the footwear.

Furthermore, the motion sensor 142 of the controlling module 14 is also disposed in the main body 51. The external force will be generated when the user wears the wearable object 5 for walking, at this time, the motion sensor 142 will detect the external force to generate the vibrating signal, and then the controlling integrated circuit 144 of the controlling module 14 will control and drive the lighting component 11 to emit light according to the vibrating signal (and/or controlling signal from the switch module 15), and then the lens module 13 projects the light with the pattern 121.

It should be noted that the light emitting device can be designed as shown in FIG. 4, FIG. 5 or FIG. 6. The light emitting device also can include the aforementioned switch module and assembling structure. These components can optionally be connected to each other in a detachable or non-detachable manner. Similarly, the design aspects of the light emitting device described in each of the foregoing embodiments can be applied to the light emitting device 1 of this embodiment.

The wearable object 5 in this embodiment of FIG. 7 is a shoe for people to wear, but in practice it is not limited to shoes, but any physical wearable object is within the scope of this creation. For example, in practice, the above-mentioned wearable items may also be personal items such as clothing, hats, backpacks, pendants, or gloves.

In summary, the light emitting device of present invention can project light with specific pattern to provide newly and interesting visual effect. Furthermore, the light emitting device of present invention can change transparent plates with different patterns of the light emitting device, thereby increasing different visual effects to enhance interest. Moreover, the light emitting device of present invention can be installed on a variety of different wearable objects, and the visual effect of changing the light emitted by the light emitting device is achieved by replacing the transparent plates with different patterns. Therefore, it will be more convenient to beautify wearable objects. At the same time, the cost is reduced by only replacing the transparent plate, allowing the user to replace the visual effects of wearable objects with fewer burdens, thereby promoting the purchasing desire.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light emitting device, comprising:

a projection module, comprising:

a lighting component configured to emit light;

a transparent plate having a pattern, wherein the light emitted from the lighting component is patterned by the transparent plate;

a lens module configured to form a projected image outside the light emitting device based on the patterned light; and a case with an axis, wherein the lighting component, the transparent plate and the lens module are arranged along the axis of the case and accommodated by the case; and a controlling module electrically coupled to the projection module, the controlling module comprising:

a circuit board, having a first surface and a second surface opposite to the first surface;

a controlling integrated circuit, disposed on the circuit board;

a motion sensor, disposed within the circuit board and electrically connected to the controlling integrated circuit, the motion sensor being configured to sequentially generate a set of vibrating signals according to a set of external forces sequentially applied to the controlling module respectively;

a switch module electrically connected to the controlling integrated circuit, wherein the switch module sequentially generates a set of controlling signals according to a set of external pressures sequentially applied to the switch module; and a battery, disposed on the circuit board and configured to provide electrical power to the controlling integrated circuit and the lighting component;

wherein, the set of controlling signals are corresponding to a set of brightness for the lighting component respectively, a set of colors for the lighting component respectively, or a set of lighting modes for the lighting component respectively, and the controlling integrated circuit, based on the corresponding brightness, color, or lighting mode for one controlling signal generated by the switch module, activates the lighting component to emit the light when the controlling module receives any of the set of vibrating signals.

2. The light emitting device of claim 1, wherein the motion sensor is encapsulated in a waterproof case.

3. The light emitting device of claim 1, wherein the controlling integrated circuit controls a brightness of the light emitted by the lighting component according to the set of vibrating signals.

4. The light emitting device of claim 1, wherein the set of lighting modes comprise a continuous mode for a specific period, a flashing mode with at a specific interval, a sequential flashing mode, a frequency variation mode, a synchronous flashing mode, a reciprocating flashing mode, an alternating flashing mode, a marquee flashing mode, a gradual brightening and dimming mode, a gradual dimming and brightening mode, or a combination thereof.

5. The light emitting device of claim 1, wherein the lighting component comprises a set of different color LED chips, and the controlling integrated circuit controls a lighting color of the light emitted by the lighting component according to the set of vibrating signals.

6. The light emitting device of claim 1, wherein the set of controlling signals further include a turn-on signal and a turn-off signal, the controlling integrated circuit supplies power to the lighting component to emit light according to the turn-on signal, and cuts off power to lighting component according to the turn-off signal.

7. The light emitting device of claim 6, wherein when the switch module is pressed with a predetermined time length greater than 1 second, the switch module generates the turn-on signal at first time, and the switch module generates the turn-off signal when be pressed with the predetermined time length again.

8. The light emitting device of claim 6, wherein when each of the set of external pressures applied to switch module is not greater than 1 second the set of controlling signals are corresponding to the set of brightness for the lighting component, the set of colors for the lighting component, or the set of lighting modes for the lighting component.

9. The light emitting device of claim 1, wherein the case of the projection module is disposed on the second surface of the circuit board, and the battery of the controlling module is disposed on the first surface of the circuit board; wherein the diameter of the case is the same or substantially the same as that of the circuit board, or the diameter of the circuit board is the same or substantially the same as that of the battery.

10. The light emitting device of claim 1, wherein the case comprises an assembling structure, the transparent plate is movably disposed in the assembling structure.

11. The light emitting device claim 1, wherein the size of the projected image external to the light emitting device is adjustable or controllable.

12. A wearable object with lighting function, comprising:

a main body;

a light emitting device, coupled to the main body, the light emitting device comprising:

a projection module, comprising:

a lighting component configured to emit light;

a transparent plate having a pattern, wherein the light emitted from the lighting component is patterned by the transparent plate;

a lens module configured to form a projected image outside the light emitting device based on the patterned light; and a case with an axis, wherein the lighting component, the transparent plate and the lens module are arranged along the axis of the case and accommodated by the case; and a controlling module electrically coupled to the projection module, the controlling module comprising:

a circuit board, having a first surface and a second surface opposite to the first surface;

a controlling integrated circuit, disposed on the circuit board;

a motion sensor, disposed within the circuit board and electrically connected to the controlling integrated circuit, the motion sensor being configured to sequentially generate a set of vibrating signals according to a set of external forces sequentially applied to the controlling module respectively;

a switch module electrically connected to the controlling integrated circuit, wherein the switch module sequentially generates a set of controlling signals according to a set of external pressures sequentially applied to the switch module respectively; and a battery, disposed on the circuit board and configured to provide electrical power to the controlling integrated circuit and the lighting component;

wherein, the set of controlling signals are corresponding to a set of brightness for the lighting component respectively, a set of colors for the lighting component respectively, or a set of lighting modes for the lighting component respectively, and the controlling integrated circuit, based on the corresponding brightness, color, or lighting mode for one controlling signal generated by the switch module, activates the lighting component to emit the light when the controlling module receives any of the set of vibrating signals.

13. The wearable object with lighting function of claim 12, wherein the motion sensor is encapsulated in a waterproof case.

14. The wearable object with lighting function of claim 12, wherein the controlling integrated circuit controls a brightness of the light emitted by the lighting component according to the set of vibrating signals.

15. The wearable object with lighting function of claim 12, wherein the set of lighting modes comprise a continuous mode for a specific period, a flashing mode with at a specific interval, a sequential flashing mode, a frequency variation mode, a synchronous flashing mode, a reciprocating flashing mode, an alternating flashing mode, a marquee flashing mode, a gradual brightening and dimming mode, a gradual dimming and brightening mode, or a combination thereof.

16. The wearable object with lighting function of claim 12, wherein the lighting component comprises a set of different color LED chips, and the controlling integrated circuit controls a lighting color of the light emitted by the lighting component according to the set of vibrating signals.

17. The wearable object with lighting function of claim 12, wherein the set of controlling signals further include a turn-on signal and a turn-off signal, the controlling integrated circuit supplies power to the lighting component to emit light according to the turn-on signal, and cuts off power to lighting component according to the turn-off signal.

18. The wearable object with lighting function of claim 12, wherein the case of the projection module is disposed on the second surface of the circuit board, and the battery of the controlling module is disposed on the first surface of the circuit board; wherein the diameter of the case is the same or substantially the same as that of the circuit board, or the diameter of the circuit board is the same or substantially the same as that of the battery.

19. The wearable object with lighting function of claim 12, wherein the case comprises an assembling structure, the transparent plate is movably disposed in the assembling structure.

20. The wearable object with lighting function of claim 12, wherein the size of the projected image external to the main body is adjustable or controllable.

* * * * *